Feb. 3, 1959 V. G. SCURA 2,872,008
COIN-ACTUATED ELECTRIC NUMBERING MACHINE
Filed Nov. 18, 1955 4 Sheets-Sheet 1
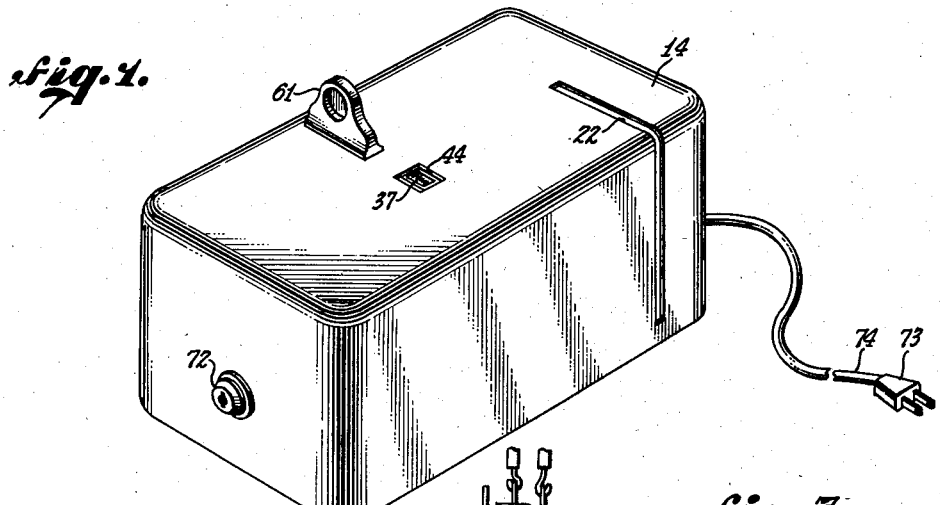
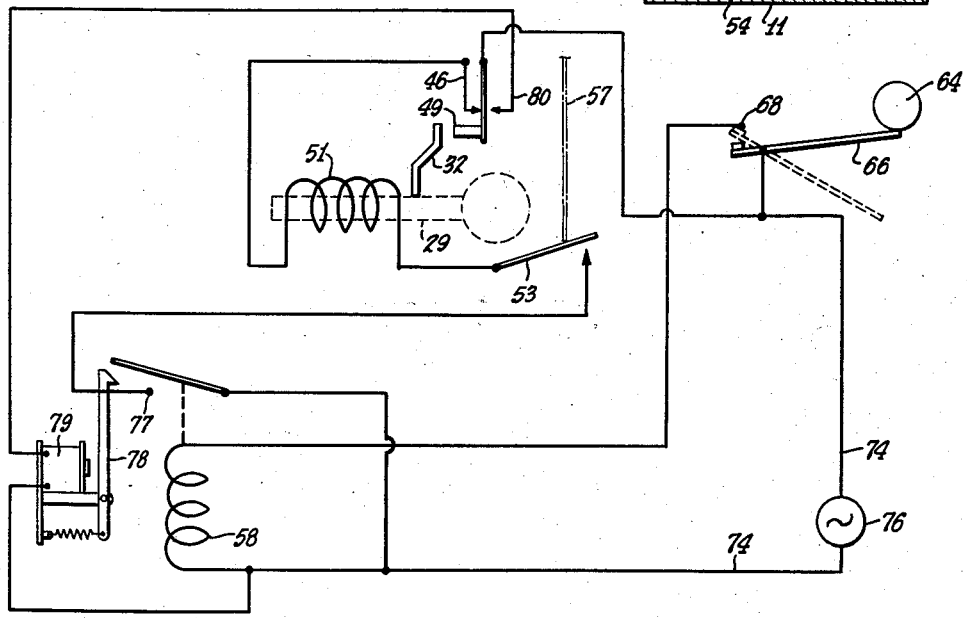
VINCENT G. SCURA,
INVENTOR.
Huebner, Beehler,
Worrel & Herzig.
ATTORNEYS.

Feb. 3, 1959  V. G. SCURA  2,872,008
COIN-ACTUATED ELECTRIC NUMBERING MACHINE
Filed Nov. 18, 1955  4 Sheets-Sheet 2

VINCENT G. SCURA,
INVENTOR.
Huebner, Beehler,
Worrel & Herzig.
ATTORNEYS.
BY:

Feb. 3, 1959   V. G. SCURA   2,872,008
COIN-ACTUATED ELECTRIC NUMBERING MACHINE
Filed Nov. 18, 1955   4 Sheets-Sheet 3

VINCENT G. SCURA,
INVENTOR.
Huebner, Beehler,
Worrel & Herzig.
ATTORNEYS.
BY:

Feb. 3, 1959 V. G. SCURA 2,872,008
COIN-ACTUATED ELECTRIC NUMBERING MACHINE
Filed Nov. 18, 1955 4 Sheets-Sheet 4

VINCENT G. SCURA,
INVENTOR.
Huebner, Beehler,
Worrel & Herzig.
ATTORNEYS.
BY:

United States Patent Office 2,872,008
Patented Feb. 3, 1959

2,872,008

COIN-ACTUATED ELECTRIC NUMBERING MACHINE

Vincent G. Scura, Studio City, Calif., assignor to Dubl-chek Corporation, Los Angeles, Calif., a corporation of California Application November 18, 1955, Serial No. 547,607

2 Claims. (Cl. 194—9)

The present invention relates to a numbering machine for stamping consecutive numbers on separate pieces of paper, such as checks, for example, and in particular to a coin actuated electric numbering machine for automatically stamping consecutive identification numbers on individual checks.

It has become the practice, for the purpose of reducing loss, to have a photograph made of the person seeking to cash a check together with the check before the check is cashed. In the event that the check is fraudulent, the record will connect the person with the fraudulent check and assist in apprehending the criminal. For convenience in maintaining records and for rapidly locating the filed photograph of the check and person passing the check, an individual identification number is stamped on the check before the photograph is made. To speed up the operation of stamping the identification number on each check as a preliminary step to photographing the check and check passer, it is desirable to have a numbering machine associated with the cameras so that a simple number stamping and photographing procedure can be established and maintained. Furthermore, it is desirable that the cost of the number stamping operation and the photographing operation be paid by the check passer because the check is being cashed for his benefit.

Accordingly, an important object of the invention is to provide a coin actuated number stamping machine capable of conveniently and rapidly stamping an individual identification number on a check.

Another object is to provide an efficient electric numbering machine that automatically changes to the next consecutive number after stamping a number on paper.

A further object is to provide a convenient and efficient electric number stamping machine actuated by dropping a coin into a slot and capable of reliably stamping individual identification numbers on checks submitted to the machine in consecutive order.

Additional objects will become apparent from the following description:

In general terms, my invention comprises an electric numbering machine containing a numbering stamp, a solenoid operatively associated with the stamp for actuating the same when the solenoid is energized, and a coin actuated switch for making contact between a source of electrical energy and the solenoid. A stamper shaft preferably is connected to the stamping mechanism and made of permeable material to serve as the core of the solenoid. A relay preferably is connected to a source of electrical energy and operatively associated with the solenoid for energizing the same when the relay is energized. The relay preferably is of the locking type provided with a pull-in coil and a reset coil.

In a specific embodiment of the invention, the circuit is arranged so that a coin, such as a dime, when introduced into a slot in the numbering machine energizes the pull-in coil of the relay and locks its contacts in a second circuit. A check upon being introduced into the machine trips a micro-switch to complete the second circuit to a solenoid which is coupled to the stamper shaft so that the shaft is thrust forward to stamp a number on the check. A flexible arm attached to the stamper shaft mechanically contacts another micro-switch after the number has been stamped, thereby energizing the reset coil which unlocks the relay and opens the solenoid. The numbering machine is then set to receive another coin and check to repeat the cycle of operations.

A more detailed description of a specific embodiment of the invention is given with reference to the drawings, wherein:

Figure 1 is a perspective view showing the enclosed numbering machine as applied to numbering checks with an individual identification number upon the introduction of a coin into the machine;

Figure 2 is a circuit diagram schematically showing the arrangement of the components in the machine shown in Figures 3 and 4;

Figure 7 is a fragmentary detailed view of a portion of Figure 5 showing a micro-switch actuated by a check introduced into the machine.

Figure 3:
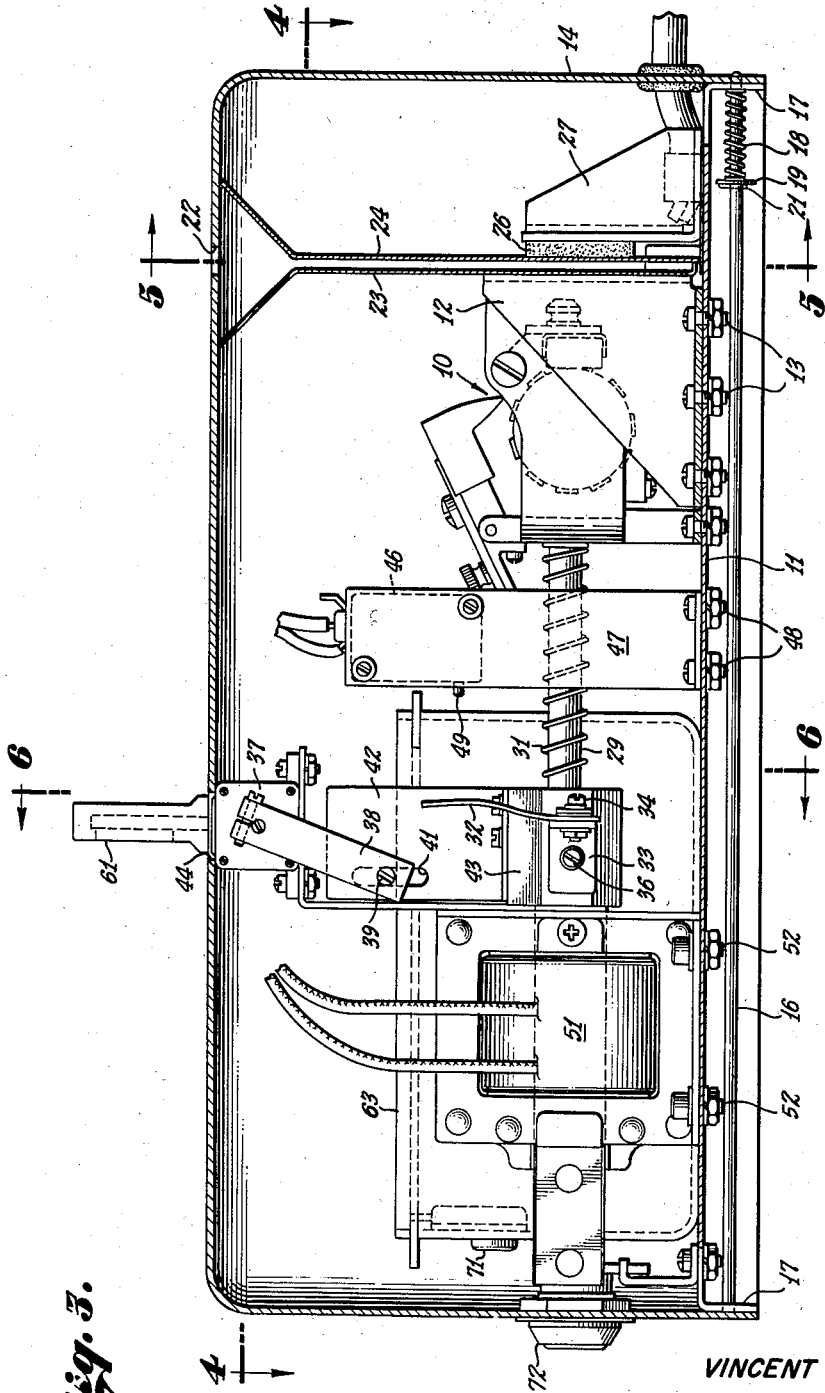
Figure 3 is a sectional elevational view taken on the line 3—3 of Figure 4.
Figure 4:
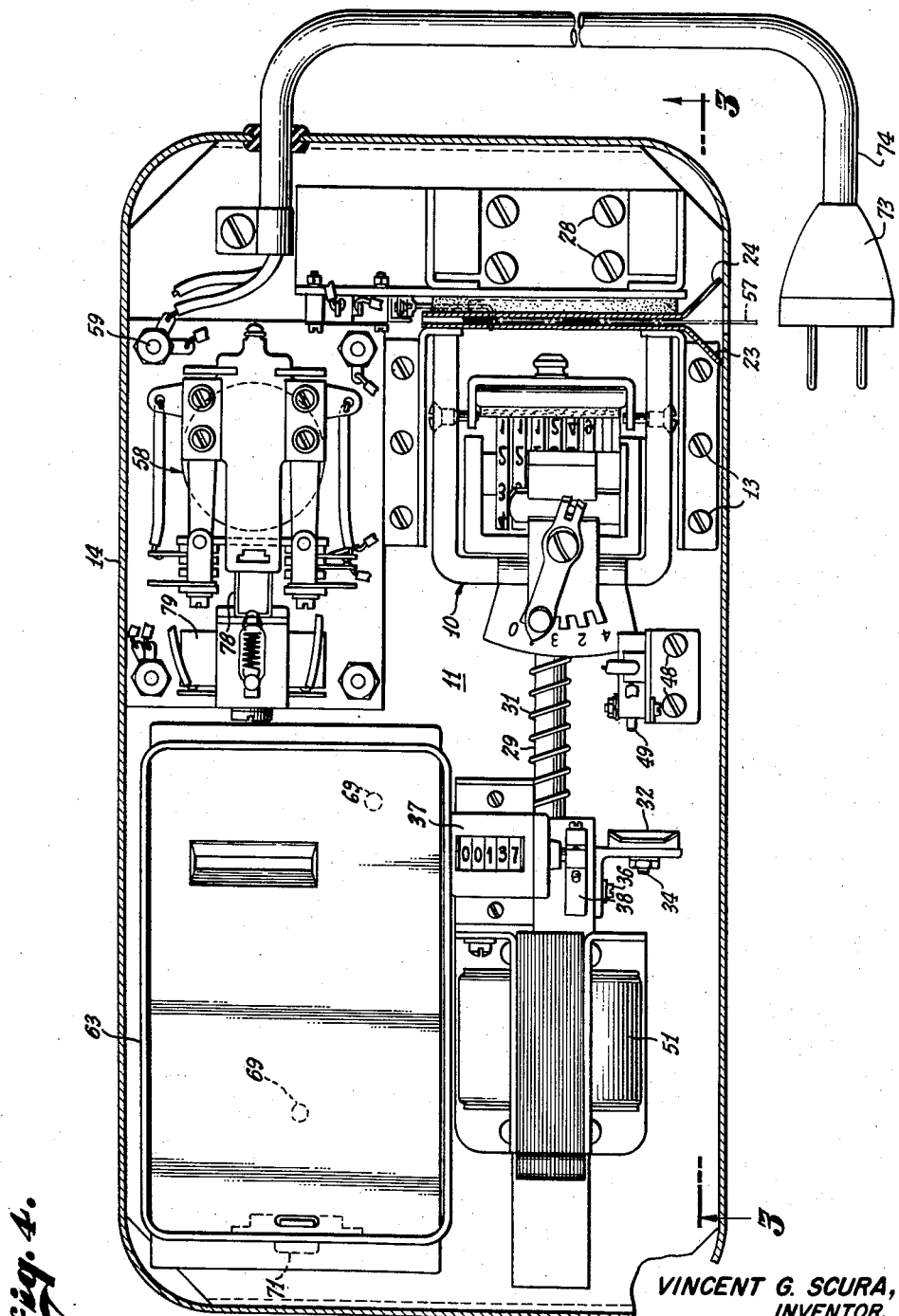
Figure 4 is a cross-sectional view taken along the line 4—4 of Figure 3.

In the embodiment shown in the drawings, an automatically changing numbering machine 10 provided with multiple movement is suitably mounted on a sheet metal bottom plate 11 in a bracket 12 by nuts and bolts 13. A cover 14 is removably fastened over the bottom 11 by rods 16 fitting in apertures cut through flanges 17 at the opposite ends of the bottom 11 and in registering apertures cut through the bottom of the sides of cover 14. The rods 16 are provided at one end thereof with compression springs 18 loaded against a washer 19 and cotter pin 21 to tightly retain rods 16 in position and lock cover 14 over bottom 11.

A check slot 22 is cut through a portion of the top and side of cover 14. Check guide plates 23 and 24 are mounted inside cover 14 in alignment with the check slot 22. The check guide plates 23 and 24 are mounted parallel with respect to each other but are bent at an angle at their edges adjacent the guide slot 22 to form a flared arrangement for guiding a check inserted in slot 22 between the check guide plates 23 and 24.

Check guide plate 23 is adjacent the stamping end of numbering machine 10 and is provided with an aperture so that the numbering machine can stamp a number on a check when inserted into slot 22 between guide plates 23 and 24. Guide plate 24 also is provided with an aperture in registry with the one in plate 23. A stamping pad 26 is held tightly against the aperture in plate 24 by a bracket 27 mounted on bottom plate 11 by nuts and bolts 28. The stamping pad 26 and bracket 27 provide a firm surface on which numbering machine 10 stamps a number on a check positioned between plates 23 and 24.

A stamper shaft 29 is connected to the numbering machine 10 and is surrounded by a compression spring 31 which returns the stamper shaft to its original position after a number has been stamped on a check. A flexible arm 32 is attached to the stamper shaft 29 by a bracket 33 and connecting nut and bolt 34 and screw 36. A Veeder-Root counter 37 is mechanically coupled to the stamper shaft through a link 38 carrying a screw 39 slidably fitted in a slot 41 in a plate 42 mounted on a collar 43 attached to stamper shaft 29. Each stamping cycle of the numbering machine 10 is indicated on the counter 37, and the total number of stampings at a given time can be seen through an opening 44 in the top of cover 14.

A micro-switch 46 is mounted on bottom plate 11 by a bracket 47 and nuts and bolts 48. A contact 49 of the micro-switch is directed toward the flexible arm 32 and is positioned so that when the stamper shaft 29 has advanced the stamp into position to stamp a number on a check flexible arm 32 will contact point 49 and trip micro-switch 46.

The stamper shaft 29 is made of permeable material, such as soft iron, and extends into the coil of a solenoid 51 to function as a core for the solenoid. The solenoid 51 is mounted on bottom plate 11 by means of nuts and bolts 52 so that the axis of the solenoid is in alignment with that of the stamper shaft 29.

Figure 5:
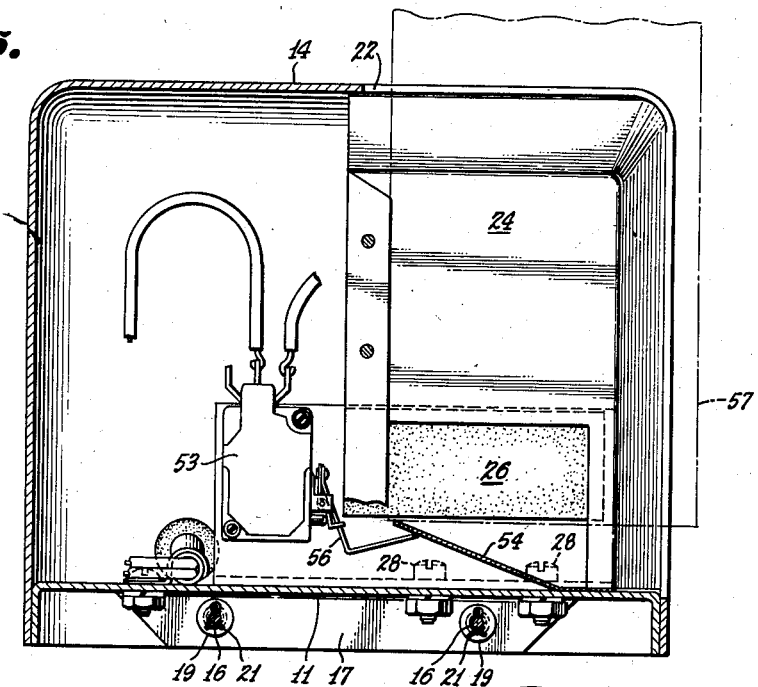
Figure 5 is a vertical sectional view taken along the line 5—5 of Figure 3.

A micro-switch 53 is mounted adjacent the bottom of check guide plates 23 and 24. A resilient strip extends upward between the guide plates 23 and 24 at an angle to the bottom plate 11 to which it is fastened, as best shown in Figure 5. The resilient member 54 normally engages a crank 56 and when a check 57 is inserted through check slot 22 and between guide plates 23 and 24 resilient member 54 is depressed toward bottom plate 11 and crank 56 is turned in a clockwise direction to close micro-switch 53. When the check 57 is removed from the machine, resilient member 54 moves upward in a clockwise direction and is followed by crank 56 in a counterclockwise direction to open micro-switch 53. The closing and opening positions of micro-switch 53 are best shown in Figures 5 and 7.

A locking relay also is mounted on bottom plate 11 at 58 by nuts and bolts 59. The locking relay is provided with a pull-in coil, a mechanical contact locking mechanism, and a reset coil of conventional design.

Figure 6:
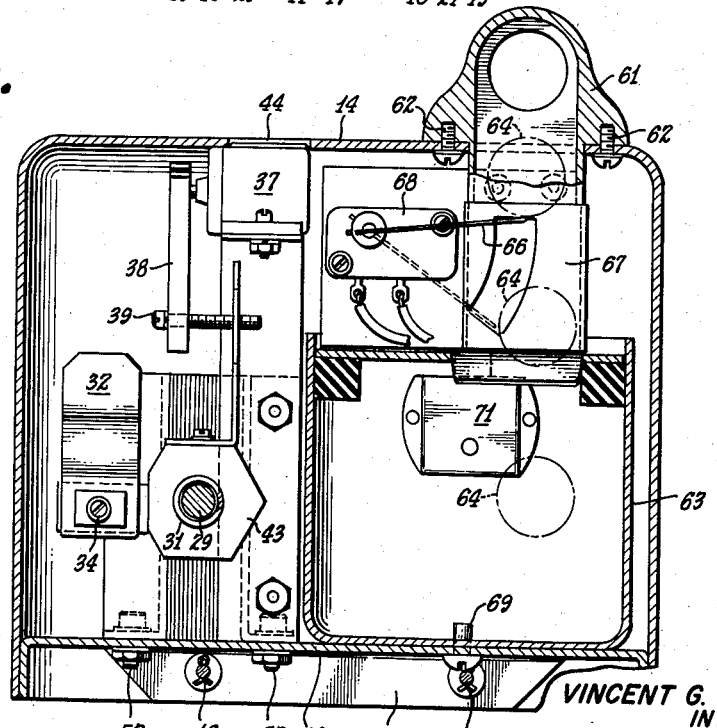
Figure 6 is a similar view taken along the line 6—6 of Figure 3.

A coin receiving means 61 is mounted above a slot in the top of cover 14 by screws 62 and is adapted to receive and drop a coin 64, such as a dime, through the slot in the top of cover 14, as indicated in Figure 6. While dropping toward coin box 63, the coin 64 engages a lever 66 and depresses the lever in a clockwise direction to a point shown in dotted outline, at which the coin slides over the end of the lever 66 and drops through a slot in the top of coin box 63. The movement of the coin 64 in depressing the lever 66 takes place through a coin guide 67. The movement of the lever 66 with the coin 64 from its normal uppermost position to its lowermost position shown in dotted outline causes a closing of micro-switch 68.

Coin box 63 is positioned with positioning pins at 69 on bottom plate 11. The cover of the coin box is normally locked on, such as by a lock 71, so that a filled coin box may be removed and then replaced with an empty one. Thus, the person removing the filled coin box does not have access to the coins. The cover 14 normally is locked on bottom plate 11 by a lock 72 to protect the numbering machine components from being tampered with and to discourage anyone from attempting to break into the coin box 63.

The operation of the specific embodiment of the invention described above will be explained primarily with reference to the circuit diagram of Figure 2. The plug 73 at the end of cord 74 is plugged into a source of electrical energy 76. The operator, desiring to cash a check after having an identifying number stamped thereon, places a coin 64 into the coin receptacle 61 and the coin drops through a slot in the top of cover 14 as previously described. Lever 66 is tripped by coin 64 and micro-switch 68 is closed momentarily. This energizes the pull-in coil of the locking relay 58. The energized pull-in coil closes contact at 77. The switch blade 77 is then held closed by a latch 78 of a reset coil 79. The check 57, upon being inserted into slot 22 between guide plates 23 and 24, trips micro-switch 53, closing it as shown in Figure 7, and completes the circuit to the solenoid 51 through the micro-switch 46. This energizes the solenoid and causes it to thrust stamper shaft 29 forward and to cause an individual identifying number to be stamped on check 57. It will be seen that the operator desiring to cash a check may first place the check in the slot 22 which trips micro-switch 53, then place a coin 64 into the coin receptacle, to complete the circuit to the solenoid.

As the number is stamped on check 57, flexible arm 32 mechanically contacts contact point 49 on micro-switch 46, thereby energizing a reset coil 79 in the relay 58. The energized reset coil unlatches blade 77 to unlock relay 58 and de-energize the solenoid 51. This shut-off action utilizes the principle of inertia in that the flexible arm 32 is momentarily left behind by the forward thrust of the stamper shaft 29 by the solenoid 51. A fraction of a second after the solenoid core or stamper shaft 29 comes forward to stamp the number, the flexible arm makes contact with the point 49 of the micro-switch 46 and the stamper shaft 29 of the solenoid is released to its original position through the utilization of the coil spring 31 surrounding the stamper shaft 29. When the check 57 is withdrawn from the machine, micro-switch 53 returns to the open position as shown in Figure 5 and micro-switch 68 automatically returns to the open position after a coin 64 has tripped it as described previously. Contact 77 and latch 78 return to the open position shown in the diagram and the machine is ready to go through another cycle of operations upon the introduction of another coin 64 and another check 57.

It will be seen in the diagram in Figure 2 that a first circuit is formed with a source of electrical energy and a coin actuated micro-switch 68 and relay 58 connected in series. A second circuit is connected to the source of electrical energy 76 in parallel to the first circuit. The second circuit contains in series connection the contact 77, the check actuated micro-switch 53, the solenoid 51, and normally closed micro-switch 46. The reset coil 79 of the locking relay 58 is connected in parallel with the relay contact 77, micro-switch 53, and solenoid 51 through a contact point 80 of micro-switch 46.

It will be understood that variations and changes in the circuit diagram can be made and that similar changes in the components of the circuit can be made without departing from the spirit of the invention. The Veeder-Root counter, which indicates the number of checks stamped and the number of coins received by the machine, has been shown to be mechanically coupled to the stamper shaft, but it will be understood that an electrically operated counter can be electrically coupled to the described circuit. It will be understood that although the embodiment of the invention described above in connection with the drawing was specifically applied to the numbering of checks that the machine of the invention can be applied to many other situations wherein it is desired to stamp a number on a slip or sheet of paper or other material, and wherein it is desired to actuate the machine by the insertion of a coin therein. Accordingly, it is understood that such various applications of the invention and such changes, modifications, and variations in the specific numbering machine described above may be made within the scope of the appended claims without departing from the spirit of the invention.

What is claimed is:

1. An electric numbering machine for consecutively numbering successive workpieces comprising a consecutive numbering stamp, a stamper shaft connected to the stamp, a solenoid coupled to the shaft to actuate the shaft and the stamp for stamping a number on a workpiece positioned adjacent the stamp, a switch connected to the solenoid and arranged to establish electrical connection to the solenoid by the positioning of a workpiece adjacent the stamp, a locking relay connected to a source of electrical energy and operatively associated with the solenoid for energizing the solenoid when the relay is locked, a coin-actuated switch operatively associated with a coin slot for energizing the relay by introduction of a coin in the slot, and a switch operatively associated with the stamper shaft for unlocking the relay and electrically disconnecting the solenoid as the samp numbers the workpiece.

2. An electric numbering machine for consecutively numbering workpieces, comprising a consecutive numbering stamp, a stamper shaft connected to the stamp, a solenoid coupled to the shaft to actuate the shaft and the stamp for stamping a number on a workpiece positioned adjacent the stamp, a workpiece-actuated micro-switch connected to the solenoid and arranged to temporarily establish electrical connection to the solenoid by the positioning of a workpiece adjacent the stamp, a locking relay having a pull-in coil and a re-set coil operatively associated with the solenoid for energizing the solenoid when the relay is locked, the pull-in coil being connected to a source of electrical energy, a coin-actuated micro-switch operatively associated with a coin slot and connected to the pull-in coil for temporarily energizing the pull-in coil upon introduction of a particular denomination coin in the slot by completing a circuit and locking the relay contacts in a second circuit connected to the source of electrical energy in parallel to the first-mentioned circuit, the second circuit containing in series connection the relay contacts, the workpiece-actuated micro-switch and the solenoid, the re-set coil being connected in parallel with the relay contacts, the workpiece-actuated micro-switch and the solenoid, and a shut-off micro-switch operatively associated with the stamp for energizing the re-set coil when the stamp has numbered the workpiece and for unlocking the relay and de-energizing the solenoid.

References Cited in the file of this patent
UNITED STATES PATENTS

| | | |
|---|---|---|
| 1,000,613 | Lambertt | Aug. 15, 1911 |
| 2,077,724 | Svenson | Apr. 20, 1937 |
| 2,266,825 | Streckfuss | Dec. 23, 1941 |
| 2,328,858 | Sweetland | Sept. 7, 1943 |
| 2,342,048 | Halfin | Feb. 15, 1944 |